(12) United States Patent
Dubreuil et al.

(10) Patent No.: US 7,658,545 B2
(45) Date of Patent: *Feb. 9, 2010

(54) COMPLIANT FOIL-FLUID BEARING SUPPORT ARRANGEMENT

(75) Inventors: Jean Dubreuil, Boucherville (CA); Denis Leclair, St-Nicephore (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 1523 days.

This patent is subject to a terminal disclaimer.

(21) Appl. No.: 10/536,125

(22) Filed: Apr. 2, 2004

(65) Prior Publication Data

US 2009/0185766 A1 Jul. 23, 2009

Related U.S. Application Data

(63) Continuation of application No. 10/232,591, filed on Aug. 30, 2002, now Pat. No. 6,786,642.

(51) Int. Cl.
*F16C 29/06* (2006.01)
*F16C 25/02* (2006.01)
(52) U.S. Cl. .................. 384/106; 384/192
(58) Field of Classification Search .............. 384/103, 384/106, 192, 215, 220
See application file for complete search history.

(56) References Cited

U.S. PATENT DOCUMENTS

| 4,045,098 | A |   | 8/1977  | Blondeel          |
|-----------|---|---|---------|-------------------|
| 4,274,683 | A |   | 6/1981  | Gray et al.       |
| 4,296,976 | A |   | 10/1981 | Heshmat           |
| 4,402,618 | A |   | 9/1983  | Fortmann et al.   |
| 4,451,163 | A |   | 5/1984  | Glaser            |
| 4,465,384 | A |   | 8/1984  | Heshmat et al.    |
| 4,502,795 | A |   | 3/1985  | Klaass et al.     |
| 4,767,222 | A |   | 8/1988  | Paletta et al.    |
| 4,806,023 | A |   | 2/1989  | Cragel            |
| 5,032,028 | A |   | 7/1991  | Riazuelo et al.   |
| 5,209,577 | A | * | 5/1993  | Swatek ........... 384/220 |
| 5,902,049 | A | * | 5/1999  | Heshmat .......... 384/106 |
| 5,911,511 | A | * | 6/1999  | Saville ........... 384/106 |
| 5,921,683 | A |   | 7/1999  | Merritt et al.    |
| 6,158,893 | A |   | 12/2000 | Heshmat           |

FOREIGN PATENT DOCUMENTS

EP 0554144 7/1993
JP 9317763 12/1997

* cited by examiner

*Primary Examiner*—Thomas R Hannon
(74) *Attorney, Agent, or Firm*—Ogilvy Renault LLP

(57) ABSTRACT

A foil-fluid bearing assembly adapted for supporting a shaft within an outer bearing housing and is adapted for accommodating angular misalignment of the rotating shaft relative to the housing.

15 Claims, 3 Drawing Sheets

COMPLIANT FOIL-FLUID BEARING SUPPORT ARRANGEMENT

CROSS REFERENCE TO RELATED APPLICATIONS

This application is a continuation of U.S. patent application Ser. No. 10/232,391 filed Aug. 30, 2002 now U.S. Pat. No. 6,786,642.

TECHNICAL FIELD

The present invention relates generally to a foil-fluid bearing, and in particular, to a foil-fluid bearing comprising compliant supports.

BACKGROUND OF THE INVENTION

Foil-air bearings are advantageous as they operate efficiently over a large temperature range, have increasing load capacity as rotational speeds increase, can handle severe environmental conditions, and are more reliable than rolling element bearings because they require fewer parts to support the rotating assemblies and do not need lubrication. However, they also require inherently tight tolerance controls on the bearings themselves and their housings in order to maintain a very close alignment between each radial bearing in a rotor system in order to operate effectively. Bearing misalignment can be caused by excessive manufacturing tolerances, operational loads or thermal distortion of the bearing housing, and can result in shaft angular misalignment causing unacceptable whirl instability. Existing foil-air bearings also require a good control of both radial stiffness and damping characteristics of the inner foil support structure.

The use of hydrodynamic fluid journal bearings having compliant foils is known. The inner foils of the bearing are arranged such that the end sections of the foils themselves are more compliant than the central section of the foils, and can deflect independently in order to provide improved conformity to a misaligned rotor supported by the bearing. Strong misalignment forces can thereby be tolerated. U.S. Pat. No. 4,274,683 teaches such a compliant foil bearing. However, these hydrodynamic journal bearings require metallic corrugated foil assemblies that are comprised of several separate sections of foils, which must each be independently flexible and able to deflect different controlled amounts. Introducing independent flexibility to the metallic foils themselves considerably adds to the complexity, and consequently cost, of the bearing. Additionally, as each bearing requires several discrete metallic foil sections having different flexibility, the complexity and manufacturing costs are further increased.

There remains a need to provide a foil-fluid bearing capable of tolerating angular misalignment, without significantly adding complexity to the internal construction of the bearing, and consequently without significantly adding to material and manufacturing costs.

SUMMARY OF THE INVENTION

It is an object of the present invention to provide an improved foil-fluid bearing capable of increased angular misalignment tolerance.

It is an object of the present invention to provide a foil-fluid bearing having a simplified compliant support arrangement.

Therefore, in accordance with the present invention, there is provided a foil-fluid bearing assembly adapted for supporting a shaft within an outer bearing housing, the foil-fluid bearing assembly comprising: a bearing sleeve having an outer surface and an inner circumferential surface diametrically sized to receive the shaft therewithin such that an annular clearance gap is radially defined between an outer surface of the shaft and the inner circumferential surface, the annular clearance gap adapted for accommodating fluid therein and axially extending along a substantial portion of a length of the bearing sleeve; a foil element disposed within the annular clearance gap; a compliant bearing support contiguously disposed between the outer surface of the bearing sleeve and the outer bearing housing, and permitting elastic deflection of the compliant bearing support, independent of movement of the foil element; and the compliant bearing support comprising at least two independent compliant support elements respectively having a first and a second modulus of elasticity, wherein the first modulus of elasticity is less than the second modulus of elasticity; whereby angular misalignment capability for the foil-fluid bearing is provided by the compliant bearing support.

There is also provided, in accordance with the present invention, a foil-fluid bearing assembly adapted for rotatably supporting a shaft within a bearing housing, the foil-fluid bearing assembly comprising: a bearing sleeve having an outer surface and an inner surface defining an inner race, said inner race diametrically sized to receive a rotating shaft therewithin and maintain an annular clearance gap radially between said rotating shaft and said inner circumferential surface, the annular clearance gap axially extending along a substantial portion of a length of the bearing sleeve, the bearing sleeve adapted, in use, to supply a support fluid to substantially fill said annular clearance gap; a foil element circumferentially disposed between said inner race and said shaft; a compliant bearing support disposed between the outer surface of the bearing sleeve and the bearing housing; and the compliant bearing support having at least two independent compliant support elements, said at least two independent compliant support elements respectively having a first and a second modulus of elasticity, wherein the first modulus of elasticity is less than the second modulus of elasticity.

There is additionally provided, in accordance with the present invention, a foil-fluid bearing assembly comprising: a compliantly supported bearing sleeve, radially disposed between a rotating shaft and an outer housing, such that an annular clearance gap, adapted for receiving a support fluid therein, is provided between the rotating shaft and the bearing sleeve; a foil element being radially disposed within the annular clearance gap; the bearing sleeve being compliantly supported within the outer housing by at least two independent compliant supports, radially disposed between the bearing sleeve and the outer housing; and the two independent compliant supports respectively having a first and second modulus of elasticity, the first modulus of elasticity being less than the second modulus of elasticity.

BRIEF DESCRIPTION OF THE DRAWINGS

Further features and advantages of the present invention will become apparent from the following detailed description, taken in combination with the appended drawings, in which.

DETAILED DESCRIPTION OF THE PREFERRED EMBODIMENT

Figure 1:
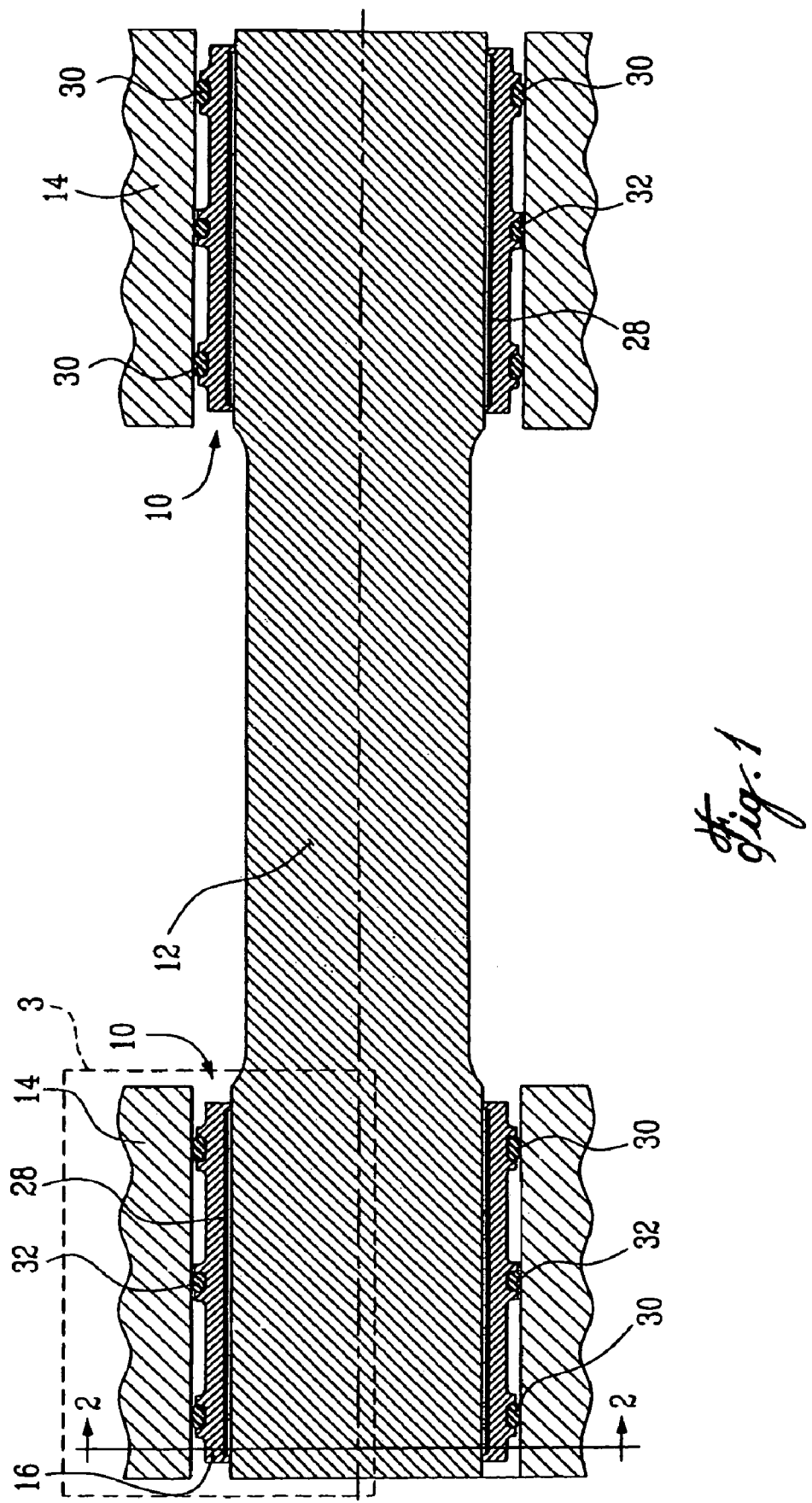
FIG. 1 is an axial cross-sectional view of a shaft supported at either end by a compliantly supported foil-fluid bearing according to the present invention.

Referring first to FIG. 1, each foil-fluid bearing assembly 10 of the present invention generally comprises a bearing sleeve 16 supporting a rotating shaft 12 within an outer bearing housing 14. At least one compliant support 30,32 is radially disposed between the bearing sleeve and the outer housing, and is capable of elastically deflecting to tolerate misalignment of the bearing sleeve with respect to the outer housing. The bearing sleeve 16 comprises an inner bore therethrough having a diameter such that a precise annular radial gap 24 is defined between an inner circumferential surface of the sleeve and an outer surface of the shaft. Much like all foil bearings, the present bearing comprises an inner foil member 28, disposed within the annular radial gap 24. The foil member 28 is preferably comprised of at least two foils, an inner smooth foil providing a fluid film running surface and at least one outer corrugated foil or equivalent spring foil. Many corrugated foils can be radially stacked between the inner smooth foil and the inside circumferential surface 18 of the bearing sleeve 16. The corrugated foils provide some of the low stiffness and damping required for the compliance of the smooth foil. The smooth foil provides a smooth running surface for the film of fluid that forms within the annular radial gap 24.

Traditional air bearings having sleeves rigidly fixed to the surrounding housing, require very tight tolerance controls on the bearings and their housings, in order to maintain a good alignment between each of the radial bearings of a rotor system.

The present foil-fluid bearing preferably comprises three compliant supports installed on each bearing sleeve, each compliant support contiguous with, and radially disposed between, the bearing sleeve and the outer bearing housing. A central compliant support, axially located between two compliant end supports, having a higher modulus of elasticity than the two end compliant supports, permits the bearing sleeve to swivel around the stiffer middle compliant support.

Figure 2:
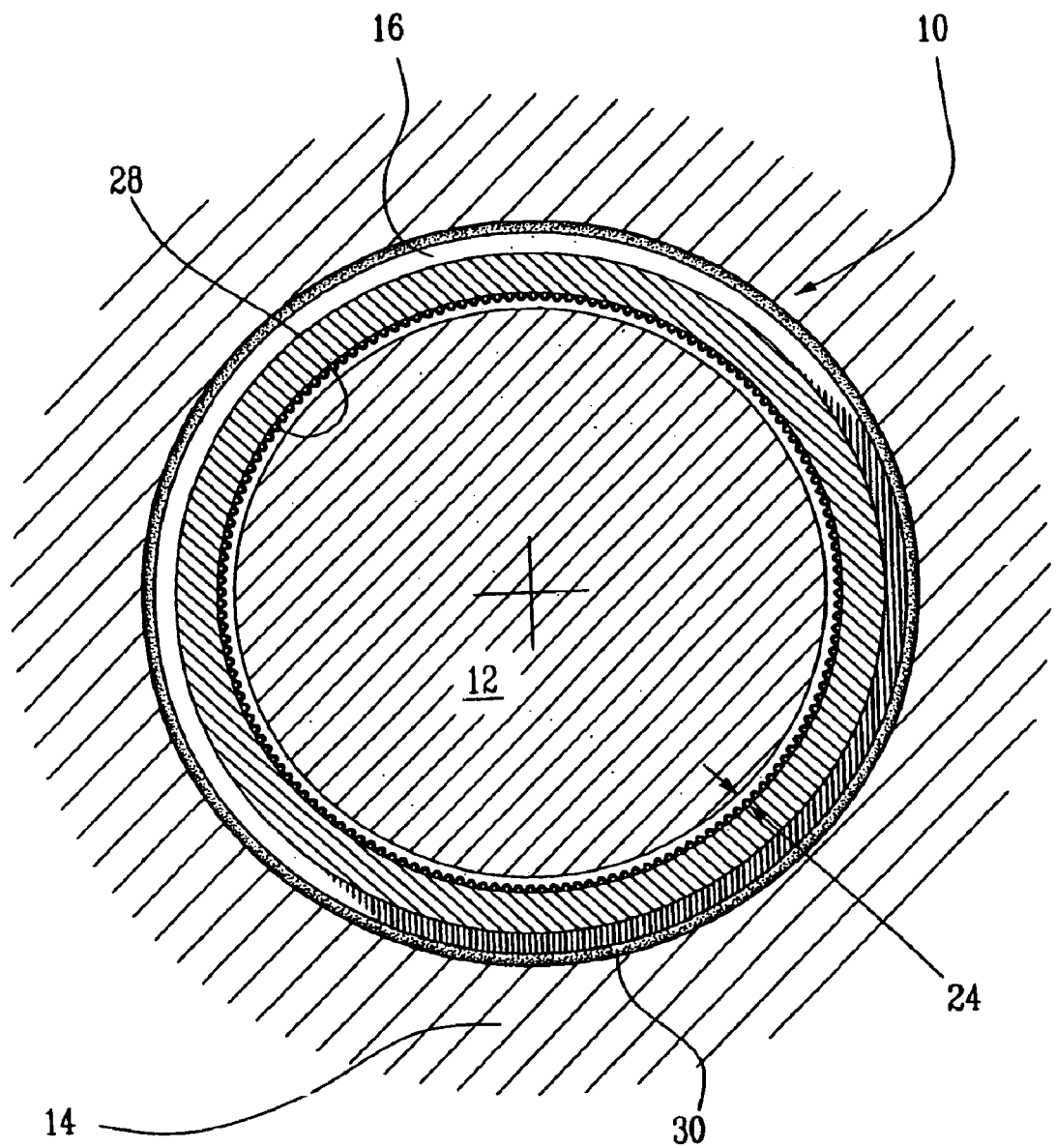
FIG. 2 is a cross-sectional view taken along line 2-2 of FIG. 1.

This permits the compliant bearing to self-align with another radial bearing supporting the shaft or rotor system. Such a shaft or rotor system could for example, have at least another similar compliant foil-fluid bearing at its opposite end, as shown in FIG. 2. Similarly, the present compliant foil-fluid bearing could be used on a shaft or rotor system in combination with any number of other bearings. This enables greater tolerance for bearing misalignment, which can result from any one of, or combination of, several factors including manufacturing tolerances, operational loads, and thermal displacements of the housing.

Figure 3:
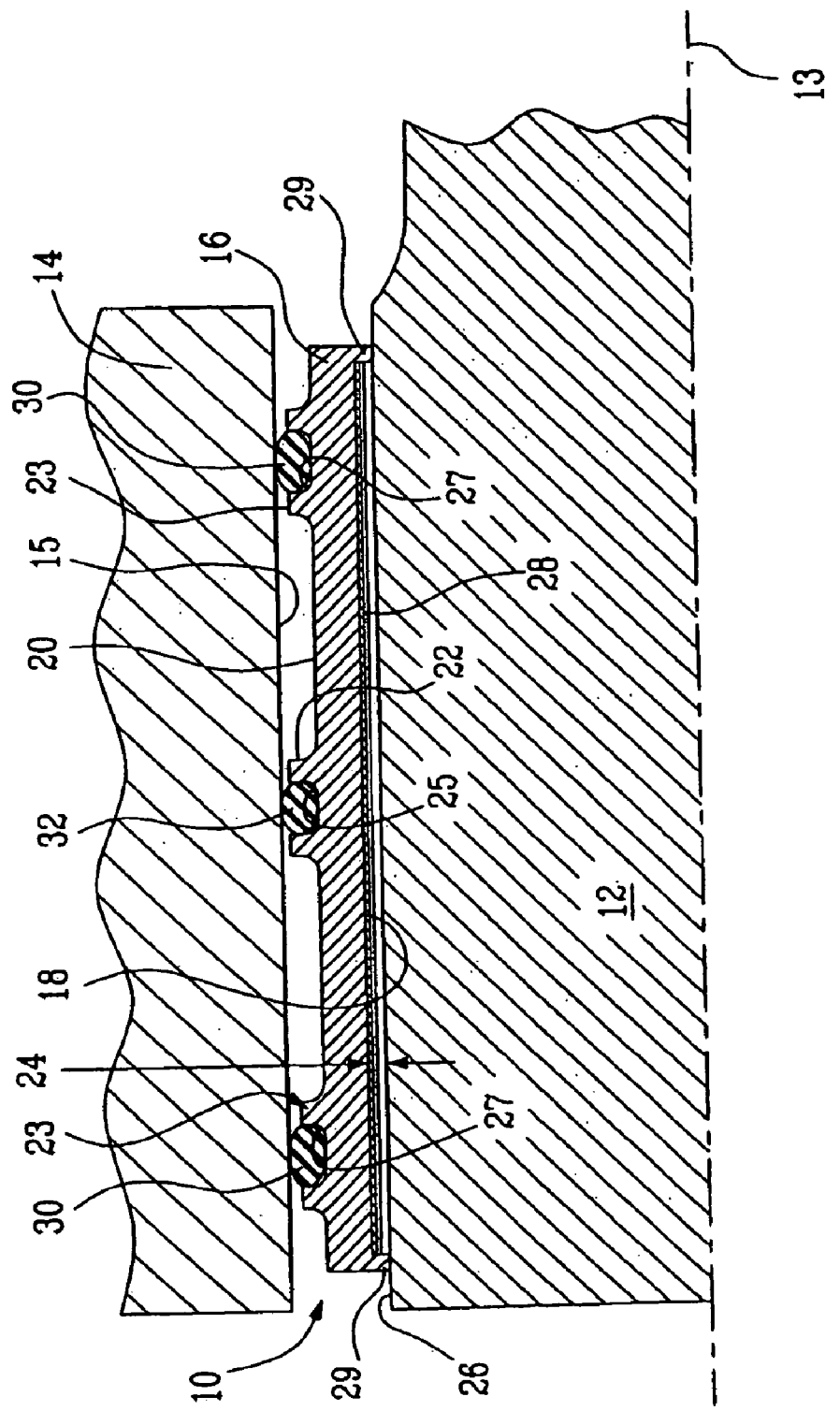
FIG. 3 is a partial cross-sectional view enlarged from region 3 of FIG. 1.

Referring now to FIG. 2 and FIG. 3, the foil-fluid bearing assembly 10 of the preferred embodiment comprises the bearing sleeve 16 comprising an inner circumferential surface 18, and an outer circumferential surface 20 having three annular support points thereon. The support points each comprise an annular notch, disposed radially outwardly and being adapted for receiving an annular compliant support therein. Specifically, the middle support point 22 has annular notch 25 formed therein, and the two outer support points 23 define annular notches 27 therein. The central support point notch 25 receives annular compliant middle support 32, and the two outer support points notches 27 receive annular compliant end supports 30. As mentioned above, the two compliant end supports 30 have a predetermined lower modulus of elasticity, and are therefore less stiff, than the middle compliant support 32. While the middle support point 22 is preferably at the axial midpoint of the bearing sleeve 16, the distance between the middle support point and the end support points can be modified as required to provide more or less rotational flexibility of the bearing sleeve about an axis perpendicular to the longitudinal axis 13 of both the bearing sleeve and the shaft 12. Both the stiffer central compliant support 32 and the outer compliant supports 30 are in contacting engagement with the inner circumferential surface 15 of the outer bearing housing 14.

The generally cylindrical bearing sleeve 16 comprises a concentric central bore therethrough, defined by the inner circumferential surface 18 that is precisely diametrically sized to receive the shaft therewithin such that a controlled annular radial gap 24 is provided between the outer surface 26 of the shaft 12 and the inner circumferential surface 18 of the sleeve. The annular gap 24 axially extends along the length of the bearing sleeve and is axially closed off by inwardly projecting circumferential tabs 29 or may alternately be axially retained by other mechanical features, depending on the particular foil design. The corrugated foils 28 of the bearing are disposed within the annular gap 24, and extend about the full circumference of the bearing sleeve. The foils 28 of the present bearing preferably have an axial length substantially equal to the length of the gap 24, however several separate sections of corrugated foils, each extending about the full circumference of the sleeve but axially extending only along a fraction of the full axial length of the bearing sleeve, could nevertheless be used. The corrugated foils 28 are generally fixed at an outer radial edge to the inner circumferential surface 18 of the bearing sleeve, and extend freely into the annular gap at inner radial edges thereof.

The foils act much as is well known in foil bearings of the prior art. As opposed to traditional journal bearings wherein the radial clearance between the shaft and the bearing sleeve is fixed, the foils of the foil-fluid bearing of this invention deflect radially outward in order to provide a relatively constant radial fluid film clearance when shaft growth due to temperature and centrifugal forces occurs. As the shaft turns, hydrodynamically generated pressure pushes the foils away from the shaft, keeping the shaft completely fluid-borne. When the shaft radially grows due to thermal expansion, the foils get pushed radially further away, keeping the fluid film clearance relatively constant.

While foils can be themselves made flexible in order to provide some damping which is required to suppress whirl instability resulting from bearing misalignments, in order to be sufficiently compliant the prior art flexible foils must be considerably complex and are therefore expensive to manufacture. The present invention can use simple and relatively inexpensive non-flexible foils, as damping to prevent whirl instability and bearing misalignment is provided by the compliant bearing sleeve supports. As radial stiffness and the damping characteristics of the bearing are provided by the compliant supports, externally from the inner foil construction of the bearing, significant manufacturing cost reductions can be realised.

As the compliant supports can be removed and replaced with other compliant elements having different stiffness, size or material characteristics, the radial stiffness and misalignment tolerances of the present foil bearing can easily be modified as required for a specific application.

The compliant support arrangement of the present foil bearing permits significantly improved capability to tolerate angular misalignment between radial bearings. This subsequently permits the use of bearing housings that are less finely toleranced, resulting in significant manufacturing cost savings.

A single central compliant support for the bearing sleeve could be used in specific limited applications, however care must be taken to ensure that such applications, having the present foil-fluid bearing with a single compliant support, are running at a rotational speed outside the natural frequency envelope of the bearing and shaft assembly, otherwise excessive oscillation of the sleeve can occur. The two compliant end supports located either side of the central, and stiffer, compliant support provide damping against such natural frequency oscillation of the sleeve. Therefore, the three point compliant support arrangement is preferable, however a single central compliant support for the bearing sleeve within the housing can nevertheless be used for applications that will always operate outside the above-mentioned rigid body mode frequency of the sleeve.

The total radial stiffness and damping characteristics of the preferred embodiment of the present compliant support arrangement, wherein a stiffer central compliant bearing sleeve support is disposed between two compliant end supports having a lower modulus of elasticity than the central support, can be controlled and varied as required by proper compliant material and size selection, as it would for two or more compliant supports having equal stiffness. The rotational flexibility of the bearings sleeve about an axis perpendicular to the longitudinal axis of the shaft can also be varied as required, by changing the distance between the stiffer middle compliant support and the side compliant supports.

The foil-fluid bearing of the present invention is preferably an air bearing, although it can equivalently be used for foil bearings using a process fluid other than air, such as helium, xenon, refrigerants, liquid oxygen and liquid nitrogen.

The present foil-air bearing could be used in a variety of applications, however it is particularly intended for use in an air cycle machine, employed in an aircraft air conditioning system for example. Almost all aircraft currently use air cycle machines in their environmental control systems, and the present foil-air bearing particularly lends itself for use in such an air cycle machine. The present foil-air bearing is also particularly intended for use in a gas turbine engine. Such a foil-air bearing could, however, equally be used in other rotating machinery applications, such as motor driven compressors and other fuel driven turbomachines.

The invention claimed is:

1. A foil-fluid bearing assembly for use in a housing, the assembly comprising:
   a bearing sleeve, disposed between a rotating shaft and the housing, such that an clearance gap, adapted for receiving a support fluid therein, is provided between the rotating shaft and the bearing sleeve;
   a foil element being disposed within the clearance gap;
   at least two independently-deflectable elastic supports supporting the bearing sleeve within the housing, disposed between the bearing sleeve and the housing; and
   the first elastic support being radially stiffer than the second elastic support.

2. The foil-fluid bearing assembly as defined in claim 1, wherein the at least two elastic supports comprise three supports including a central support being stiffer than two opposing end supports.

3. The foil-fluid bearing assembly as defined in claim 2, wherein the two opposing end supports have substantially the same stiffness.

4. The foil-fluid bearing assembly as defined in claim 1, wherein the at least two elastic supports are disposed and retained in respective recesses in the bearing sleeve.

5. The foil-fluid bearing assembly as defined in claim 1, wherein the at least two elastic supports are deflectable independently from foil element movement.

6. The foil fluid bearing assembly as defined in claim 1, wherein the at least two elastic supports are contiguously disposed around an interface between the bearing sleeve and the housing.

7. The foil fluid bearing assembly as defined in claim 1, wherein the at least two elastic supports and the bearing sleeve facilitate rotational flexibility of the bearing sleeve about an axis perpendicular to a longitudinal axis of the shaft.

8. A foil-fluid bearing assembly adapted for rotatably supporting a shaft within a bearing housing, the foil-fluid bearing assembly comprising:
   a bearing sleeve having an outer surface and an inner surface defining an inner race, said inner race sized to receive a rotating shaft therewithin and maintain a substantially annular clearance gap between said rotating shaft and said inner surface, the bearing sleeve adapted, in use, to direct a pressurized support fluid to substantially fill said clearance gap and thereby rotatably support said shaft;
   a foil element circumferentially disposed between said inner race and said shaft; and
   a bearing support disposed between the outer surface of the bearing, sleeve and the bearing housing, the bearing support having three independently-deflectable elastic support elements arranged with a central support element between two end support elements, said central support element being radially stiffer than the end support elements.

9. The foil-fluid bearing assembly as defined in claim 8, wherein the central support element is substantially disposed at an axial midpoint of the bearing sleeve.

10. The foil-fluid bearing assembly as defined in claim 8, wherein the central support element is disposed substantially equidistantly between the end support elements.

11. The foil-fluid bearing assembly defined in claim 8, wherein the end support elements are disposed adjacent opposing ends of the bearing sleeve.

12. The foil-fluid bearing assembly as defined in claim 8, wherein the end support elements have substantially the same stiffness.

13. The foil-fluid bearing assembly as defined in claim 8, wherein the elastic support elements are disposed and retained in respective recesses in the bearing sleeve.

14. The foil-fluid bearing assembly as defined in claim 8, wherein the elastic support elements are deflectable independently from foil element movement.

15. The foil fluid bearing assembly as defined in claim 8, wherein the elastic support elements are contiguously disposed between the bearing sleeve and the bearing housing.

* * * * *